(12) United States Patent
Sato et al.

(10) Patent No.: US 8,277,880 B2
(45) Date of Patent: Oct. 2, 2012

(54) METHOD FOR MANUFACTURING PLUGGED HONEYCOMB STRUCTURE

(75) Inventors: Fumiharu Sato, Kasugai (JP); Ken Itadu, Tajimi (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/086,525

(22) Filed: Apr. 14, 2011

(65) Prior Publication Data

US 2011/0262639 A1 Oct. 27, 2011

(30) Foreign Application Priority Data

Apr. 22, 2010 (JP) ................. 2010-099140

(51) Int. Cl.
*B05D 7/22* (2006.01)
*B01J 32/00* (2006.01)

(52) U.S. Cl. ........ 427/181; 427/201; 427/238; 427/294; 502/439

(58) Field of Classification Search .................. 427/181, 427/201, 238, 294; 502/439
See application file for complete search history.

(56) References Cited

U.S. PATENT DOCUMENTS

| | | | |
|---|---|---|---|
| 7,700,163 B2 * | 4/2010 | Ingram-Ogunwumi et al. | 427/553 |
| 2004/0001919 A1 * | 1/2004 | Aderhold et al. | 427/294 |
| 2006/0287193 A1 * | 12/2006 | Tsuji et al. | 502/100 |
| 2007/0191219 A1 | 8/2007 | Fujita et al. | |
| 2007/0224092 A1 | 9/2007 | Miyairi et al. | |

FOREIGN PATENT DOCUMENTS

| | | |
|---|---|---|
| EP | 1 818 097 A1 | 8/2007 |
| EP | 1 842 591 A1 | 10/2007 |
| JP | 10-249124 A1 | 9/1998 |
| JP | 2006-000685 A1 | 1/2006 |
| WO | 2010/110010 A1 | 9/2010 |

\* cited by examiner

*Primary Examiner* — Frederick Parker
(74) *Attorney, Agent, or Firm* — Burr & Brown

(57) ABSTRACT

A method for manufacturing a plugged honeycomb structure including a step of mixing ceramic particles with a gas on one end face side of the plugged honeycomb structure, and a step of sucking the gas containing the ceramic particles from the other end face side of the plugged honeycomb structure to send the ceramic particles mixed in the gas into cells of the plugged honeycomb structure to allow the ceramic particles to adhere to surfaces in the cells of the plugged honeycomb structure.

5 Claims, 7 Drawing Sheets

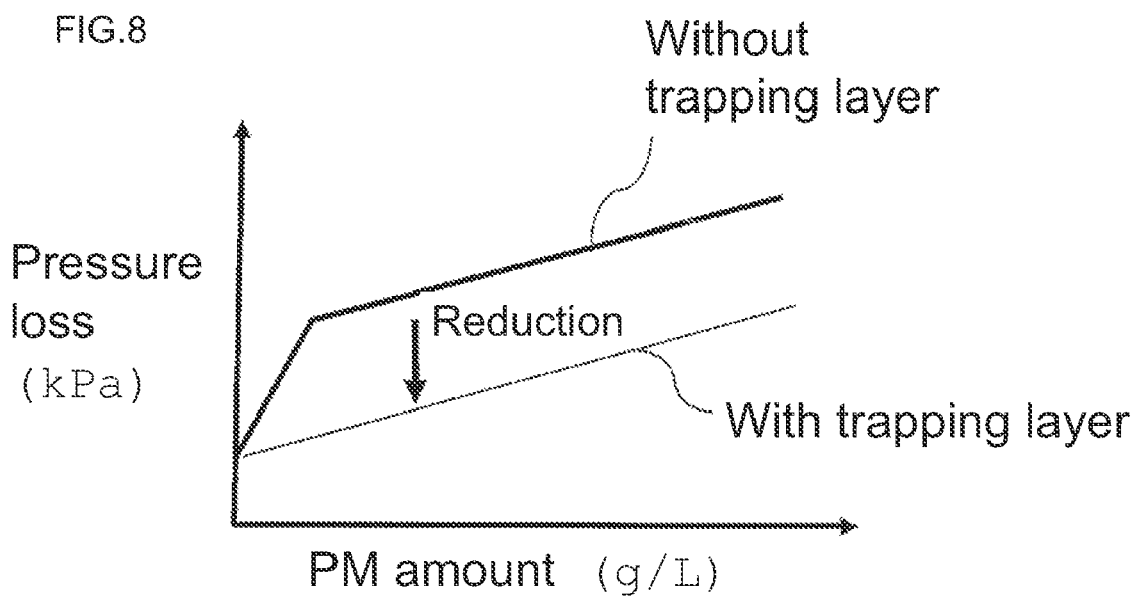

METHOD FOR MANUFACTURING PLUGGED HONEYCOMB STRUCTURE

BACKGROUND OF THE INVENTION

The present invention relates to a method of manufacturing a plugged honeycomb structure having a substrate of a porous article and trapping layers which are provided on the surfaces of the substrate and trap particulate matter.

In gas discharged from internal combustion engines such as a diesel engine, various combustion apparatuses, and the like, a large amount of particulate matter (PM) mainly containing soot is contained. Since environmental pollution is caused when the PM is released in the air with no change, a filter apparatus for trapping PM is mounted in a flow passage of the exhaust gas.

As the core filter element of such a filter apparatus, for example, a honeycomb structure which is plugged (plugged honeycomb structure) is used. The plugged honeycomb structure has a plurality of cells separated by partition walls of a ceramic porous article having a large number of pores and functioning as gas passages (to obtain a honeycomb structure), and one side opening ends and the other side opening ends of adjacent cells are alternately plugged. When the plugged honeycomb structure is canned to allow exhaust gas to flow into the structure from one opening end of a cell, the exhaust gas passes through the partition walls and flows out from the other side opening ends of adjacent cells, and PM is trapped by the partition walls at that time to purify the exhaust gas.

However, in such a plugged honeycomb structure, since PM enters the inside of the porous article (substrate) to clog the pores, pressure loss is prone to increase rapidly. Therefore, in order to try to suppress pressure loss, for example, each of JP-A-10-249124 and JP-A-2006-685 discloses a plugged honeycomb structure having a new structure or a filter element as the use of the plugged honeycomb structure. As the common characteristics of these plugged honeycomb structures (filter elements), trapping layers for trapping PM are provided on a porous article (substrate) to try to inhibit the PM from entering the inside of the substrate by the trapping layers and inhibit pressure loss from rising. In addition, each of JP-A-10-249124 and JP-A-2006-685 discloses a method for manufacturing the new plugged honeycomb structure.

JP-A-10-249124 aims to manufacture a filter element of a ceramic material, where a filter layer is unitarily provided on one side face of a porous article. The filter element does not have a dense intermediate layer at the boundary of the porous article and the bonding portion of the filter layer and has low pressure loss with little clogging. In order to achieve the aim, in JP-A-10-249124, ceramic particles are conveyed by means of a gas current and allowed to adhere to one side surface of a porous article, and moisture (water or steam) is imparted to the adhering ceramic particles to allow the ceramic particles to be adsorbed to the one side face of the porous article and to allow the particles to mutually aggregate moderately and adhere in a secondary particle state, and thereby the ceramic particles are inhibited from entering the pores of the porous article and forming a dense intermediate layer. Specifically, the pore size of the filter layer is made smaller than the average pore size of the porous article, and the average particle diameter of the ceramic particles (forming the filter layer) is made to be ½ to ⅔ of the average pore size of the porous article. In addition, the air and the ceramic particles are sucked by a blower to form a filter layer, and the ceramic particles adhere to the porous article due to the differential pressure on the upstream side and the downstream side of the porous article.

JP-A-2006-685 aims to provide a plugged honeycomb structure excellent in the balance between the pressure loss and the trapping efficiency when the structure is used as a filter and a manufacturing method thereof. In order to achieve the aim, JP-A-2006-685 stipulates that, as an object (plugged honeycomb structure), it has ceramic particles adhering to the surfaces of the partition walls, that the average particle diameter of the ceramic particles is at least 1.5 times the average pore size of the partition walls and 200 µm or less, that ceramic particles are distributed on the surfaces of the partition walls in the range of ½ of the length from the central axis to the outer periphery, that the partition walls have a porosity of 50% to 80% and an average pore size of 15 µm to 40 µm, and the like. In addition, as a manufacturing method, it stipulates that the ceramic particles are sent into the cells from at least one end face by a fluid (gas), that ceramic particles generated upon machining the honeycomb structure are used, and the like.

However, in the manufacturing methods disclosed in JP-A-10-249124 and JP-A-2006-685, the input raw material (ceramic particles) does not form trapping layers efficiently to waste the raw material, and long time is spent for forming membranes of a desired amount. In addition, in order not to waste the raw material, the equipment and the step for reuse are necessary. Further, upon membrane formation, when the amount of ceramic particles contained in the gas for conveying the ceramic particles is large, ceramic particles are prone to aggregate, and the ceramic particles do not deposit uniformly to form membranes in a biased state.

SUMMARY OF THE INVENTION

The present invention has been made in view of such prior art problems and aims to provide a means to obtain a honeycomb structure where the input raw material (ceramic particles) is efficiently used for forming trapping layers without wasting the raw material, reuse of the raw material is unnecessary, time is not required for forming membranes to function as a trapping layer, ceramic particles are uniformly deposited, and homogeneous trapping layers are formed. As a result of repeated studies, it has been found out that the aim can be achieved by the following means, which has led to the completion of the present invention.

That is, according to the present invention, there is provided a method for manufacturing a plugged honeycomb structure, the method including: a step of mixing ceramic particles with a gas on one end face side of the plugged honeycomb structure, and a step of sucking the gas containing the ceramic particles from the other end face side of the plugged honeycomb structure to send the ceramic particles mixed in the gas into cells of the plugged honeycomb structure to allow the ceramic particles to adhere to surfaces in the cells of the plugged honeycomb structure.

In the present invention, the gas where ceramic particles are mixed may be called an aerosol. In addition, the mass of the ceramic particles mixed in the gas per volume of the gas is called an aerosol density. The aerosol density equals the mass of the ceramic particles per volume of the gas.

The aforementioned process is a membrane-forming process for providing surface trapping layers on the plugged honeycomb structure. A method for manufacturing a plugged honeycomb structure of the present invention is characterized by the membrane-forming process. The plugged honeycomb structure is constituted of a porous article having an about columnar outer shape, has a plurality of cells extending from one end face to the other end face, and is also referred to as a substrate in the present specification. The cells are separated by partition walls constituting the substrate and function as fluid passages. The surfaces in the cells of the plugged honeycomb structure where the ceramic particles are allowed to adhere are constituted of porous partition walls. Therefore, the surfaces of the plugged honeycomb structure (substrate) in the cells are sometimes referred to as cell inner surfaces or surfaces of the partition walls. In addition, the adjacent cells are plugged alternately in one side opening ends and the other side opening ends to show a checkerwise pattern when the plugged honeycomb structure is viewed from the end face sides.

In the plugged honeycomb structure as described above, ceramic particles and a gas are mixed on one end face side, and the gas containing the ceramic particles is sucked from the other end face side to convey and send the ceramic particles into the cells by the gas. The ceramic particles adhere to the surfaces, i.e., partition walls of the plugged honeycomb structure (substrate) in the cells, and thus membranes are formed in the plugged honeycomb structure.

In a method for manufacturing a plugged honeycomb structure of the present invention, the ceramic particles and the gas are mixed on the one end face side of the plugged honeycomb structure, and the gas containing ceramic particles is sucked from the other end face side of the plugged honeycomb structure. However, the object to be sucked is not limited to the ceramic particles and the gas (aerosol) mixed on the one end face side, and a gas (air) containing no ceramic particle may be sucked together.

In a method for manufacturing a plugged honeycomb structure of the present invention, it is preferable that, in the gas containing the ceramic particles, mass of the ceramic particles per volume of the gas (aerosol density) is 1 $g/m^3$ or more and 1600 $g/m^3$ or less, and the flow rate of the gas containing the ceramic particles (aerosol) in the cells is 0.2 m/sec. or more and 100 m/sec. or less. It is more preferable that density of aerosol is 20 $g/m^3$ or more and 1600 $g/m^3$ or less. In addition, the flow rate of the aerosol in the cells is more preferably 2 m/sec. or more and 100 m/sec. or less. The flow rate of the gas containing the ceramic particles (flow rate of the aerosol) in the cells is sometimes referred to as a flow rate inside the cells.

In a method for manufacturing a plugged honeycomb structure of the present invention, it is preferable that the ceramic particles adhering to the end face of the plugged honeycomb structure are removed after the step of allowing the ceramic particles to adhere to the surfaces of the plugged honeycomb structure in the cells. The end face where the removal is performed is the end face on the ceramic particle supply side.

Since the manufacturing method of a plugged honeycomb structure of the present invention has a process where ceramic particles are mixed with a gas on the one end face side of the plugged honeycomb structure and a process where the gas containing the ceramic particles is sucked from the other end face side of the plugged honeycomb structure to send the ceramic particles mixed in the gas into the cells of the plugged honeycomb structure to allow the ceramic particles to adhere to the surfaces of the cells of the plugged honeycomb structure, ceramic particles are successfully supplied to the cells, and ceramic particles can be inhibited from adhering to and depositing on the inlet end or the terminal end of the cells (The ends means the portions in the vicinity of the end faces of the plugged honeycomb structure, and, between these ends, the inlet end is the end on the ceramic particle supply side, and the terminal end is the cell inside of the plugging portion.) In addition, in comparison with the case of sending the ceramic particles with a gas under pressure, scattering of the particles is suppressed to reduce the waste, and the manufacturing environment is improved.

In a method for manufacturing a plugged honeycomb structure of the present invention, by adjusting the suction flow rate of the gas containing the ceramic particles on the other end face side, it becomes possible to control the membrane formation distribution. When the suction flow rate is high, ceramic particles deposit mainly at the terminal end (inside cells on the suction side) of the plugged honeycomb structure due to the inertial motion of ceramic particles entering the honeycomb structure, and the range from the other end face (end face where the ceramic particles enter) to the center is in the state that no ceramic particle adheres (no membrane is formed), and therefore there is a possibility that the trapping layers are not formed successfully. However, if the suction flow rate is reduced, the inertial motion of ceramic particles entering the honeycomb structure is weakened, and ceramic particles also adhere to the range from the other end face to the center of the plugged honeycomb structure, and the trapping layers are formed successfully.

In addition, it is possible to control density of the trapping layers by adjusting the suction flow rate. When the flow rate is high, the particles forming the trapping layers easily enter, and a dense structure can be formed. When the flow rate is small, particles forming the trapping layers hardly enter, and a coarse structure can be formed.

Further, also, by adjusting the flow rate of the gas containing the ceramic particles on the one end face side, the kinetic energy of the ceramic particles entering the structure can be adjusted, and it is possible to send the ceramic particles uniformly in the passages (of the gas current) formed by the suction. This respect will be described later. Thus, since a method for manufacturing a plugged honeycomb structure of the present invention can control the membrane formation distribution, the trapping layers fulfilling the aimed performance can easily be formed.

In a method for manufacturing a plugged honeycomb structure of the present invention, ceramic particles and a gas are mixed together on the one end face side of the plugged honeycomb structure, and the side functions as the ceramic particle supply side. In addition, by sucking the gas containing the ceramic particles from the other end face side of the plugged honeycomb structure, the ceramic particles are sent into the cells with the gas. Since the suction flow rate of the gas containing the ceramic particles on the other end face side can be controlled independently from the mixing of the ceramic particles with the gas on the one end face side (supply side), and the flow rate of the gas containing the ceramic particles can easily be adjusted by the suction method, it is easy to make a desired membrane formation distribution and form desired trapping layers.

In a method for manufacturing a plugged honeycomb structure of the present invention, since the gas is sucked from the other end face side, the plugged honeycomb structure (substrate) itself functions as a commutating plate, and the gas current is stabilized. Therefore, the ceramic particles deposit uniformly on the surfaces of the partition walls, and homogeneous membranes having little biased deposition of the ceramic particles can be formed. Since the trapping layers are obtained by subjecting the membranes to a thermal treatment, according to a method for manufacturing a plugged honeycomb structure of the present invention, it is possible to obtain a honeycomb structure having homogeneous trapping layers formed therein.

According to a method for manufacturing a plugged honeycomb structure of the present invention, it is possible to form membranes continuously or at the same time by the use of plural kinds of ceramic particles, and it is possible to obtain a honeycomb structure where trapping layers having a multi-layered structure are formed. In addition, it is possible to add a pore former and the like to the ceramic particles to be mixed uniformly to form membranes from the mixture.

In a preferable embodiment of a method for manufacturing a plugged honeycomb structure of the present invention, in the gas containing the ceramic particles mixed therein, since the mass of the ceramic particles per volume of the gas (density of aerosol) is 1 $g/m^3$ or more and 1600 $g/m^3$ or less, and the flow rate of the gas containing the ceramic particles in the cells is 0.2 m/sec. or more and 100 m/sec. or less, the input raw material (ceramic particles) successfully adheres to the internal surfaces of the cells and is efficiently used for forming the trapping layer, and the raw material yield is high. The waste of the raw material is little, the reuse of the raw material for inhibiting the waste is unnecessary, and time is not required for the membrane formation. The ceramic particles are successfully supplied into the cells, and the ceramic particles are inhibited from adhering to and depositing at the inlet end or terminal end of the cells. As a result, ceramic particles are securely deposited uniformly on the surfaces of the partition walls, and homogeneous membranes can be formed.

When the density of the ceramic particles is below 1 $g/m^3$, ceramic particles easily passes through the pores of the substrate without forming a bridge, and thereby the yield may fall. In addition, the time spent for the membrane formation is increased to raise the production costs of the plugged honeycomb structure with surface trapping layers. On the other hand, when the density of the ceramic particle is above 1600 $g/m^3$, ceramic particles aggregate together to cause adhesion and deposition of the ceramic particles at the cell inlets (end face of the plugged honeycomb structure), and biased deposition of the ceramic particles is caused in the cells, which makes the formation of homogeneous membranes difficult.

When the flow rate of the gas in the cells is below 0.2 m/sec., ceramic particles are prone to deposit in the vicinity of the cell inlet ends, and the number of the ceramic particles which do not reach the surfaces of the partition walls in the cells is increased. Alternatively, the inlets (openings) of the cells are clogged with the deposited ceramic particles, and the membrane formation (formation of the trapping layers) may be hindered. On the other hand, when the gas flow rate in the cells is above 100 m/sec., ceramic particles are prone to deposit at the terminal ends of the cells due to inertia, and ceramic particles depositing on the surfaces of the partition walls may decrease. The ceramic particles depositing at the terminal ends of the cells decrease the surface area of the partition walls functioning as a filter and, as a result, pressure loss is increased, and performance as a filter is deteriorated.

In a method for manufacturing a plugged honeycomb structure of the present invention, since the ceramic particles adhering to the end face of the plugged honeycomb structure are removed after the step of allowing the ceramic particles to adhere to the surfaces of the plugged honeycomb structure in the cells, it is possible to suppress the initial pressure loss rise rate with maintaining the pressure loss reduction rate with PM. Incidentally, the pressure loss reduction rate with PM and the initial pressure loss rise rate will be described later.

BRIEF DESCRIPTION OF THE DRAWINGS

FIG. 8 is a graph showing the relation between adhering PM amount and pressure loss, explaining the advantage of the plugged honeycomb structure with surface trapping layers.

Figure 1:
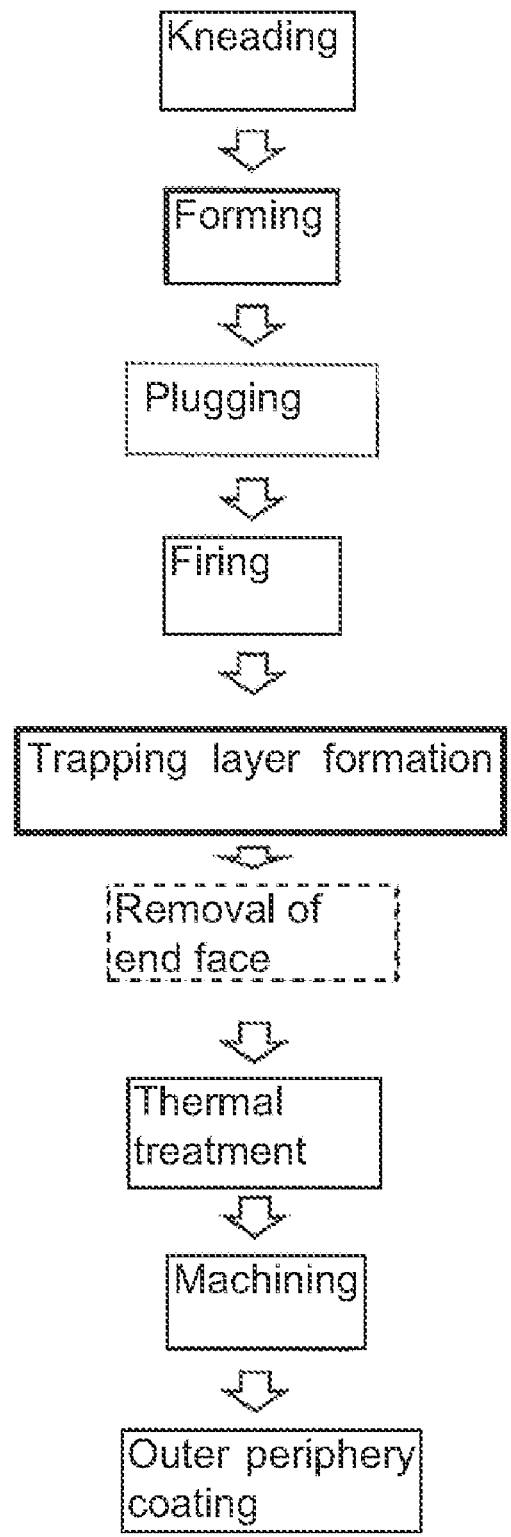
FIG. 1 is a process chart showing an embodiment of a method for manufacturing a plugged honeycomb structure of the present invention.

REFERENCE NUMERALS 1, 30, 40, 50: plugged honeycomb structure (with no surface trapping layer)
3a, 3b: cell
4: partition wall
5: PM (particulate matter)
6: exhaust gas
30a, 40a, 50a: one end face (of plugged honeycomb structure)
30b, 40b, 50b: the other end face (of plugged honeycomb structure)
31: aerosol
32, 52: container
33, 43, 53: air
34, 44, 54: fan
35, 45, 55: cylindrical article
36, 46, 56: ceramic particle
47: ceramic particle supplier
48, 58: ejector

DETAILED DESCRIPTION OF THE INVENTION

Hereinbelow, embodiments of the present invention will be described with arbitrarily referring to drawings. However, the present invention should not be construed with limiting to these, and various changes, modifications, and improvements may be made on the basis of knowledge of a person of ordinary skill as long as they do not deviate from the scope of the present invention. For example, the drawings show suitable embodiments of the present invention. However, the present invention is not limited by the embodiments shown in the drawings or the information shown in the drawings. Upon carrying out or examining the present invention, the same means as or a means equivalent to the means described in the present specification can be applied. However, a suitable means is the means described below.

Figure 6:
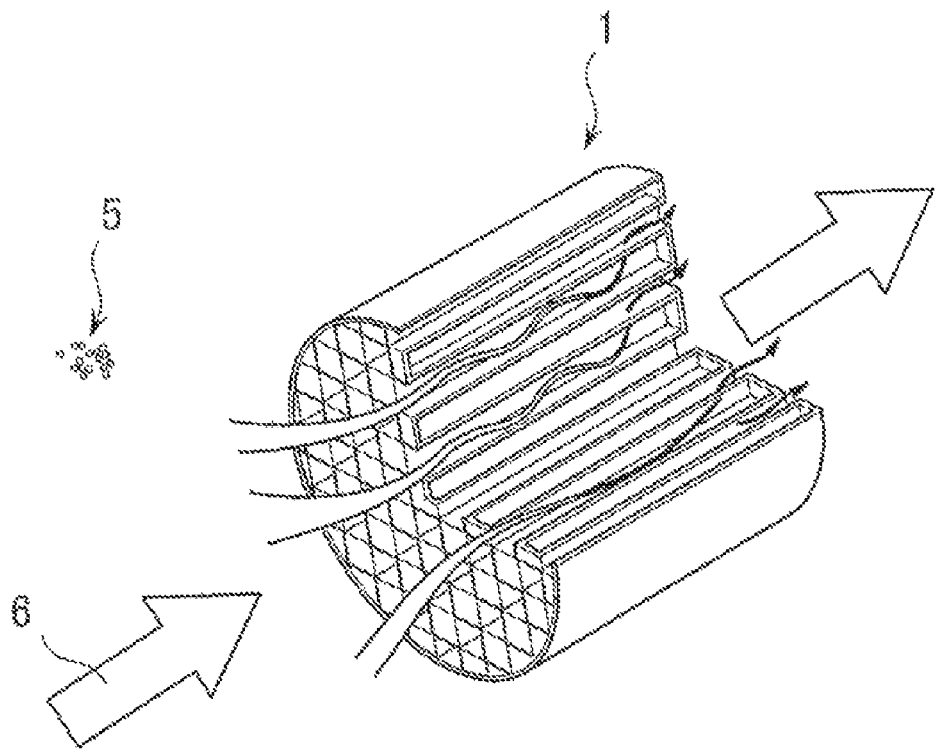
FIG. 6 is a perspective view showing an internal portion by cutting away ¼ of a plugged honeycomb structure having no surface trapping layer, explaining the advantage of the plugged honeycomb structure with surface trapping layers.
Figure 7:
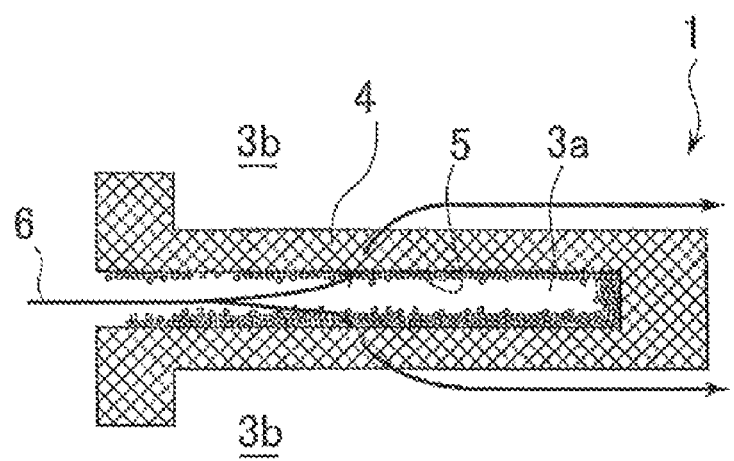
FIG. 7 is a cross-sectional view showing an enlarged part (partition walls and a cell) of a plugged honeycomb structure having no surface trapping layer, explaining the advantage of the plugged honeycomb structure with surface trapping layers.

In the first place, the advantages of the plugged honeycomb structure with surface trapping layers as an object to be manufactured by a method for manufacturing a plugged honeycomb structure of the present invention will be described with referring to FIGS. 6 to 8. In the case that the plugged honeycomb structure is used as a filter for removing PM, even in a plugged honeycomb structure 1 with no surface trapping layer provided therein, the exhaust gas 6 containing PM 5 is introduced into the cells 3$a$, passes through the partition walls 4 of the plugged honeycomb structure 1, and is discharged from the other side opening ends of the adjacent cells 3$b$. At that time, the PM 5 is trapped by the partition walls 4, and the discharged gas 6 is purified (see FIGS. 6 and 7).

However, at this time, in the case of no surface trapping layer, since the PM 5 enters the pores of the partition walls 4 (substrate) to cause clogging of the pores, pressure loss sharply rises in an early stage (see FIG. 8). In the case of a structure having surface trapping layers (a plugged honeycomb structure with surface trapping layers), since PM 5 is inhibited from entering the pores of the partition walls 4 (substrate), the pores are not clogged with PM 5, and therefore pressure loss does not rise in an early stage, and thereby reduction of pressure loss can be planned (see FIG. 8). A method for manufacturing a plugged honeycomb structure of the present invention is a means for manufacturing such an excellent plugged honeycomb structure with surface trapping layers.

Next, with referring to FIG. 1, there is described a process of manufacturing a plugged honeycomb structure with surface trapping layers, the process including the membrane formation step which is a characteristic of a method for manufacturing a plugged honeycomb structure of the present invention. FIG. 1 shows schematic manufacturing process of a unitary type plugged honeycomb structure with surface trapping layers, which is different from the segment type described later. Incidentally, regarding the process other than the membrane formation process, it is possible to manufacture a plugged honeycomb structure with surface trapping layers on the basis of known process not according to the following process.

(Kneading Step)

Framework particles (preferably one of cordierite forming raw material, silicon carbide, silicon-silicon carbide composite material, alumina, mullite, aluminum titanate, and silicon nitride), water, an organic binder (hydroxypropoxylmethyl cellulose, methyl cellulose, or the like), a pore former (graphite, starch, synthetic resin, or the like), a surfactant (ethylene glycol, fatty acid soap, or the like), and the like are mixed together and kneaded with a kneader, a vacuum kneader, or the like to obtain kneaded clay.

(Forming Step)

Next, the kneaded clay is subjected to extrusion forming by the use of an extruder provided with a die having a desired cell shape, partition wall thickness, and cell density to obtain a desired shape, followed by drying with, for example, a microwave drier and a hot air drier to obtain a unitary type formed article. This is a formed article having a honeycomb structure where the external shape is, for example, a circular columnar shape and where a plurality of cells extending from one end face to the other end face are separated by partition walls. The cell shape, partition wall thickness, cell density, and the like of the formed article can suitably be determined according to specifications of the plugged honeycomb structure with surface trapping layers to be manufactured in consideration of shrinkage during drying and firing.

(Plugging Step)

Then, adjacent cells of the formed article are alternately plugged at one side opening ends and the other side opening ends in such a manner that the one end face and the other end face of the formed article each shows a checkerwise pattern. More specifically, plugging slurry of preferably the same material as the aforementioned framework particles is stored in a container, about a half of the cells are masked to show a checkerwise pattern in one side end face of the formed article, and the end face is immersed in the slurry in the container to fill the slurry into the openings of the cells without the mask for plugging. With regard to the other side end face of the formed article, a mask is applied to the cells plugged in the one side end face (of course, the mask is applied in a checkerwise pattern), and the end face is immersed in the slurry in the container to fill the slurry into the openings of the cells without the mask for plugging. Thus, the cells not plugged in the one end face are plugged in the other end face, and the cells not plugged in the other end face are plugged in the one end face to have a structure where the cells are alternately plugged to show a checkerwise pattern in both the end faces.

(Firing Step)

Then, the plugged formed article is calcined for degreasing and then fired (main firing) to obtain a plugged honeycomb structure. The plugged honeycomb structure functions as the substrate. Since the combustion temperature of the organic binder is about 100 to 300° C., and the combustion temperature of the pore former is about 200 to 800° C., the calcination temperature may be about 200 to 1000° C. Since the firing temperature is different depending on the raw material of the framework particles, appropriate conditions may be selected according to the raw material. Generally, it is about 1400 to 1500° C.

(Trapping Layer Forming Step)

Next, ceramic particles and a gas are mixed together on the one end face side of the substrate, and the gas is sucked from the other end face side to send the aerosol into the cells of the substrate to allow the ceramic particles to adhere to and deposit on the inner surface of the cells of the substrate. At this time, the aerosol density is preferably 1 g/m$^3$ or more and 1600 g/m$^3$ or less, and the flow rate of the aerosol in the cells is 0.2 m/sec. or more and 100 m/sec. or less. Though the ceramic particles can be selected suitably for the substrate, it is preferable that the ceramic particle average particle diameter/substrate average pore size is above 0.02 and below 1.5. The ceramic particle average particle diameter/substrate average pore size means a ratio of the average particle diameter of the ceramic particles to the average pore size of the substrate. The average pore size of the substrate strictly means the average pore size of the partition walls constituting the surfaces inside the cells of the plugged honeycomb structure. By fulfilling such conditions, particularly, the input raw material (ceramic particles) successfully adheres to the cell internal surfaces and is efficiently used for the formation of the trapping layers to raise the raw material yield. This seems to be because the ceramic particles contained in the gas sucked adhere to the inlets of the pores of the partition walls and form layers covering the inlets of the pores. When the ceramic particle average particle diameter/substrate average pore size is 0.02 or less, ceramic particles may pass through the pores to deteriorate the yield, or ceramic particles may adhere to the inside of pores (wall faces inside the pores) without forming layers on the surfaces of the partition walls to reduce the pore size. On the other hand, when the ceramic particle average particle diameter/substrate average pore size is 1.5 or more, PM passes through the trapping layer and clogs pores when the structure is used as a filter to easily raise pressure loss of the filter. Though the average particle diameter of ceramic particles is naturally varied depending on the average pore size of the substrate, it is preferably about 1 to 15 µm. Preferable materials for the ceramic particles are silicon carbide, silicon nitride, cordierite forming raw material, alumina, zirconia, silica, and the like. A particularly preferable material is the same material as the aforementioned framework particles (of the substrate). More specifically, the ceramic particles can be obtained as fine particles and pulverized particles having a sharp particle diameter distribution by subjecting the material to size classification and then further subjecting the coarse particles to pulverization with a jet mil (dry type) and a pot mil (wet type).

(End Face Removal Step)

After the ceramic particles are allowed to adhere to and deposit on the inner surfaces of the cells of the substrate, the air nozzle and the like are used to remove ceramic particles remaining on the end face on the aerosol supply side (ceramic particle supply side) of the substrate.

(Thermal Treatment Step)

Then, a thermal treatment is performed to sinter the ceramic particles deposited on the inner surfaces of the cells for stabilization. The thermal treatment temperature at this time is preferably lower than the firing temperature when the substrate is obtained. The temperature required for sintering and fixing the ceramic particles may be employed. Though, the temperature is varied depending on the material for the ceramic particles, generally the firing temperature is preferably 1250 to 1350° C.

(Machining Step)

Then, for example, grinding is performed to have a desired shape.

(Outer Periphery Coating Step)

Finally, a coating material is applied to the outer periphery of the substrate, followed by drying and then disposing the outer peripheral portion to obtain a plugged honeycomb structure with surface trapping layers of a unitary type. By disposing the outer peripheral portion, the unevenness of the outer periphery of the plugged honeycomb structure with the surface trapping layer is reduced. As the coating material, there can be employed a material obtained by mixing inorganic fibers, colloidal silica, clay, SiC particles, an organic binder, a foamed resin, a dispersant, water, and the like. There is not particularly limited to the method of applying the coating material, and there may be employed a method where the material is applied with a rubber spatula or the like with rotating the substrate on a pottery wheel.

Figure 2:
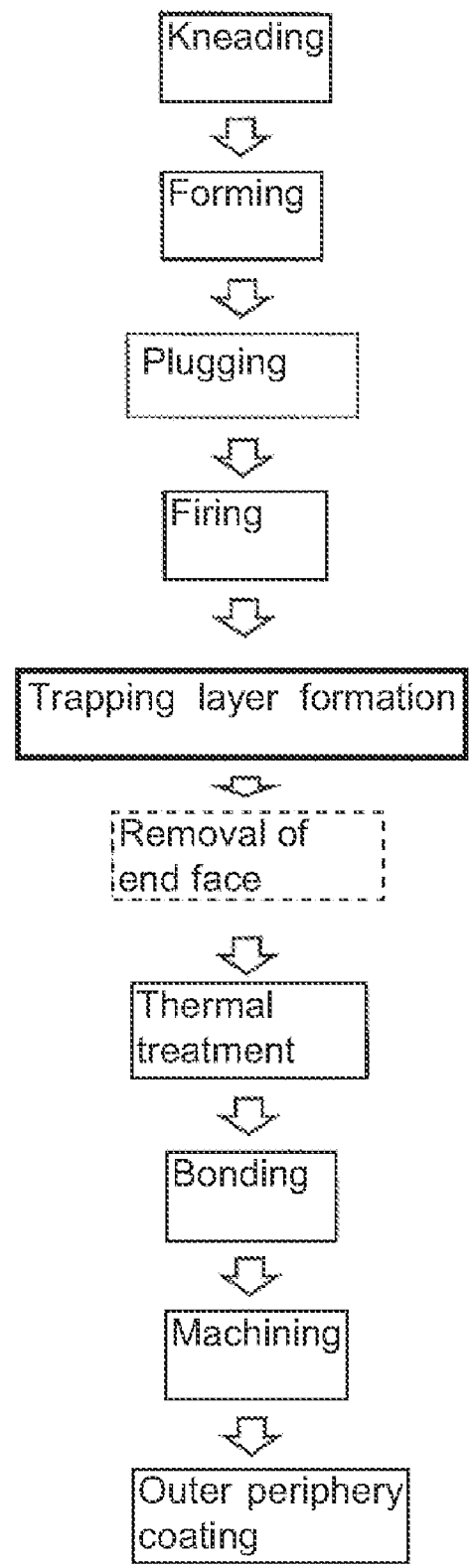
FIG. 2 is a process chart showing another embodiment of a method for manufacturing a plugged honeycomb structure of the present invention.

Next, a process for manufacturing a plugged honeycomb structure with surface trapping layers of a segment type will be described with referring to FIG. 2. FIG. 2 shows a schematic manufacturing process of a plugged honeycomb structure with surface trapping layers of a segment type. The plugging step is preferably performed for each segment before bonding the segments. In addition, the trapping layer forming step is preferably performed for each segment. However, the step may be performed after bonding the segments. Incidentally, in the case of performing the trapping layer forming step for each segment, since each segment corresponds with a plugged honeycomb structure (as an object where membranes are formed) in a method for manufacturing a plugged honeycomb structure of the present invention, though it is redundant, each segment and the like are expressed as plugged honeycomb structure (segment) and the like in the following description. By bonding the plugged honeycomb structures (segments) subjected to trapping layer formation, a plugged honeycomb structure with surface trapping layers can be obtained.

(Kneading Step)

Framework particles (of preferably one of cordierite forming raw material, silicon carbide, silicon-silicon carbide composite material, alumina, mullite, aluminum titanate, and silicon nitride), water, an organic binder (hydroxypropoxylmethyl cellulose, methyl cellulose, or the like), a pore former (graphite, starch, synthetic resin, or the like), a surfactant (ethylene glycol, fatty acid soap, or the like), and the like are mixed together and kneaded with a kneader, a vacuum kneader, or the like to obtain kneaded clay. In a plugged honeycomb structure with surface trapping layers of a segment type, silicon carbide or silicon-silicon carbide composite material is often used for the framework particles.

(Forming Step)

Next, the kneaded clay is subjected to extrusion forming using an extruder provided with a die having a desired cell shape, partition wall thickness, and cell density to obtain a desired shape, followed by drying with, for example, a microwave drier and a hot air drier to obtain a unitary formed article. This is a formed article (formed article functioning as a segment) of a honeycomb structure where the external shape is, for example, a prismatic column and where a plurality of cells extending from one end face to the other end face are separated by partition walls. The cell shape, partition wall thickness, cell density, and the like of the formed article can suitably be determined according to specifications of the plugged honeycomb structure with surface trapping layers to be manufactured in consideration of shrinkage during drying and firing.

(Plugging Step)

Then, adjacent cells of the formed article (formed article to function as a segment) are alternately plugged at one side opening ends and the other side opening ends in such a manner that the one end face and the other end face of the formed article each shows a checkerwise pattern. More specifically, plugging slurry of preferably the same material as the aforementioned framework particles is stored in a container, about a half of the cells are masked to show a checkerwise pattern in one side end face of the formed article, and the end face is immersed in the slurry in the container to fill the slurry into the openings of the cells without the mask for plugging. With regard to the other side end face of the formed article, a mask is applied to the cells plugged in the one side end face (of course, the mask is applied in a checkerwise pattern), and the end face is immersed in the slurry in the container to fill the slurry into the openings of the cells without the mask for plugging. Thus, the cells not plugged in the one side end face are plugged in the other side end face, and the cells not plugged in the other side end face are plugged in the one side end face to have a structure where the cells are alternately plugged to show a checkerwise pattern in both the end faces.

(Firing Step)

Then, the plugged formed article (formed article to function as a segment) is calcined for degreasing and then fired (main firing) to obtain a plugged honeycomb structure as a segment. If a membrane forming step is subsequently performed, the plugged honeycomb structure (segment) functions as the substrate. Since the combustion temperature of the organic binder is about 100 to 300° C., and the combustion temperature of the pore former is about 200 to 800° C., the calcination temperature may be about 200 to 1000° C. Since the firing temperature is different depending on the raw material of the framework particles, appropriate conditions may be selected according to the raw material. Generally, it is about 1400 to 1500° C.

(Trapping Layer Forming Step)

Next, ceramic particles and a gas are mixed together on the one end face side of the substrate (plugged honeycomb structure (segment)), and the gas is sucked from the other end face side to send the aerosol into the cells of the substrate to allow the ceramic particles to adhere to and deposit on the inner surface of the cells of the substrate. At this time, in the same manner as in the process for manufacturing a unitary type plugged honeycomb structure with surface trapping layers, the aerosol density is preferably 1 $g/m^3$ or more and 1600 $g/m^3$ or less, and the flow rate of the aerosol in the cells is 0.2 m/sec. or more and 100 m/sec or less. The ceramic particles can be selected suitably for the substrate in the same manner as in the process for manufacturing a unitary type plugged honeycomb structure with surface trapping layers. It is preferable that the ceramic particle average particle diameter/substrate average pore size is above 0.02 and below 1.5. The ceramic particle average particle diameter/substrate average pore size means a ratio of the average particle diameter of the ceramic particles to the average pore size of the substrate. The average pore size of the substrate strictly means the average pore size of the partition walls constituting the surfaces inside the cells of the plugged honeycomb structure. By fulfilling such conditions, particularly, the input raw material (ceramic particles) successfully adheres to the cell internal surfaces and is efficiently used for the formation of the trapping layers to raise the raw material yield. This seems to be because the ceramic particles contained in the gas sucked adhere to the inlets of the pores of the partition walls and form layers covering the inlets of the pores. When the ceramic particle average particle diameter/substrate average pore size is 0.02 or less, ceramic particles may pass through the pores to deteriorate the yield, or ceramic particles may adhere to the inside of pores (wall faces inside the pores) without forming layers on the surfaces of the partition walls to reduce the pore size. On the other hand, when the ceramic particle average particle diameter/substrate average pore size is 1.5 or more, PM passes through the trapping layer and clogs pores when the structure is used as a filter to easily raise pressure loss of the filter. Though the average particle diameter of ceramic particles is naturally varied depending on the average pore size of the substrate, it is preferably about 1 to 15 μm. Preferable materials for the ceramic particles are silicon carbide, silicon nitride, cordierite forming raw material, alumina, zirconia, silica, and the like. A particularly preferable material is the same material as the aforementioned framework particles (of the substrate). More specifically, the ceramic particles can be obtained as fine particles and pulverized particles having a sharp particle diameter distribution by subjecting the material to size classification and then further subjecting the coarse particles to pulverization with a jet mil (dry type) and a pot mil (wet type).

(End Face Removal Step)

After the ceramic particles are allowed to adhere to and deposit on the inner faces of the cells of the substrate (plugged honeycomb structure (segment)), the air nozzle and the like are used to remove ceramic particles remaining on the end face on the aerosol supply side (ceramic particle supply side) of the substrate.

(Thermal Treatment Step)

Then, a thermal treatment is performed to sinter the ceramic particles deposited on the inner surfaces of the cells for stabilization. The thermal treatment temperature at this time is preferably lower than the firing temperature when the substrate is obtained. The temperature required for sintering and fixing the ceramic particles may be employed. Then, the temperature is varied depending on the material for the ceramic particles, generally the firing temperature is preferably 1250 to 1350° C.

(Bonding Step)

Next, the desired number of the plugged honeycomb structures (segments) are bonded with a bonding material and then dried to obtain a plugged honeycomb structure where a plurality of segments are adjacently disposed so that side faces face each other and where the side faces facing each other are bonded with a bonding portion. It is preferable that the bonding portion is disposed on the entire side faces facing each other. The bonding portion plays a role of buffering (absorbing) the volume change upon thermal expansion or thermal shrinkage and a role of bonding the segments. As a method for disposing the bonding material on the side faces of each segment, there may be employed an application means such as brush application. An example of the bonding material is slurry obtained by adding water to a mixture obtained by adding additives such as an organic binder, a foamed resin, and a dispersant to inorganic raw materials such as inorganic fibers, colloidal silica, clay, and SiC particles, followed by kneading.

(Machining Step)

Then, the plugged honeycomb structure (obtained by bonding the segments) is subjected to, for example, grinding to have, for example, a circular cylindrical external shape.

(Outer Periphery Coating Step)

Finally, a coating material is applied to the outer periphery of the substrate, followed by drying and then disposing the outer peripheral portion to obtain a plugged honeycomb structure with surface trapping layers of a segment type. By disposing the outer peripheral portion, the unevenness of the outer periphery of the plugged honeycomb structure with the surface trapping layer is reduced. As the coating material, there can be employed a material obtained by mixing inorganic fibers, colloidal silica, clay, SiC particles, an organic binder, a foamed resin, a dispersant, water, and the like. There is not particularly limited to the method of applying the coating material, and there may be employed a method where the material is applied with a rubber spatula or the like with rotating the substrate on a pottery wheel.

Next, with showing an apparatus used in a method for manufacturing a plugged honeycomb structure of the present invention as an example, there will be given a description of a specific method where ceramic particles and a gas are mixed together on one end face side of the plugged honeycomb structure and where the gas is sucked from the other end face side to send the ceramic particles into the cells by the gas to allow the ceramic particles to adhere to the surface of the plugged honeycomb structure in the cells.

[First Membrane Forming Method]

Figure 3:
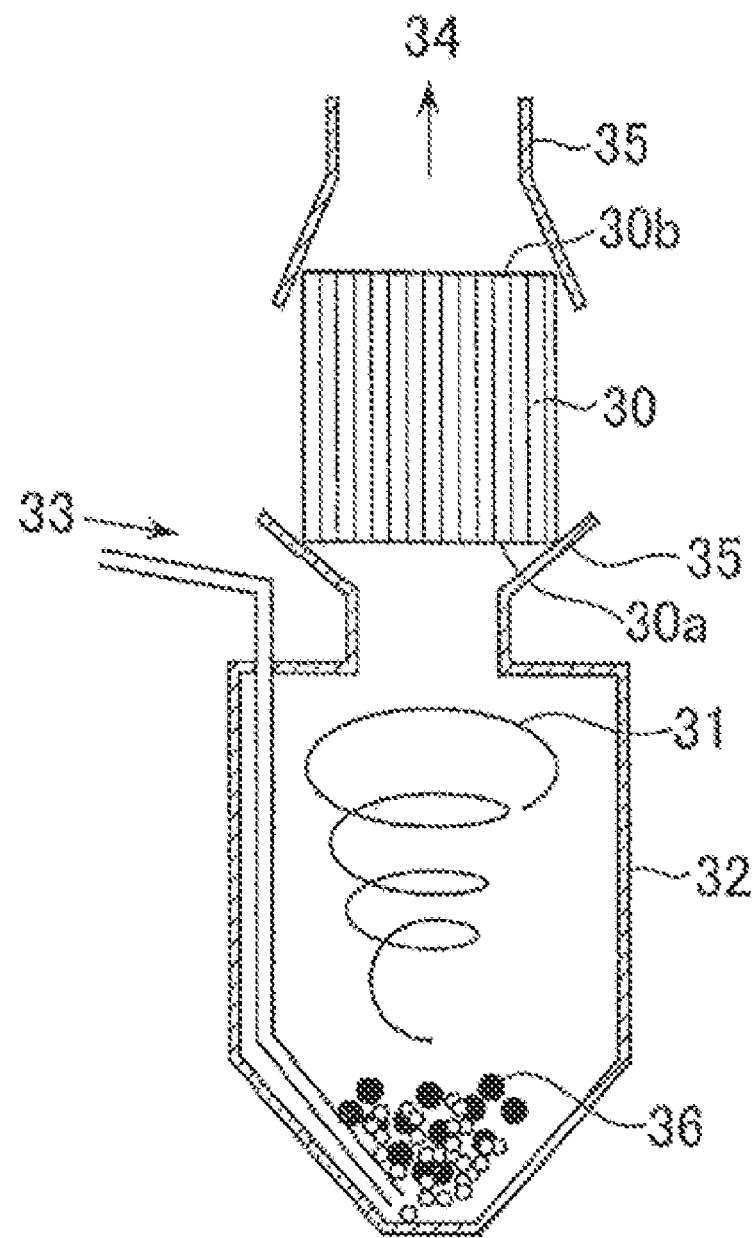
FIG. 3 is a schematic view showing one embodiment of the apparatus used for carrying out a method for manufacturing a plugged honeycomb structure of the present invention.

As one means, as shown in FIG. 3, passages are formed with cylindrical bodies 35 on both of the one end face 30a side and the other end face side 30b of the plugged honeycomb structure 30, and a container 32 is disposed on the one end face 30a side. Ceramic particles 36 are put in the container 32 in advance, and the air 33 is sent in the container 32 to flow. The ceramic particles 36 and the air 33 (gas) are mixed together in a fluidized state to form aerosol 31. In this state, by sucking with, for example, a fan 34 (not illustrated) from the other end face 30b side, ceramic particles 36 are conveyed by the air current to be sent into the cells of the plugged honeycomb structure 30 and adhere to the surfaces of the plugged honeycomb structure 30 in the cells.

[Second Membrane Forming Method]

Figure 4A:
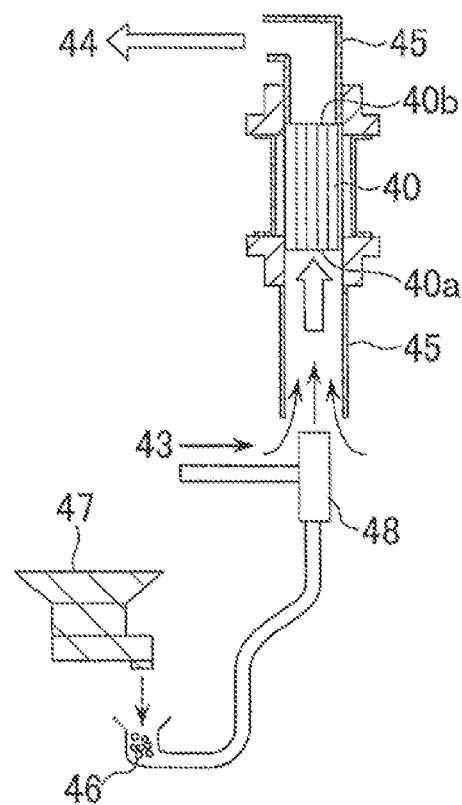
FIG. 4A is a schematic view showing another embodiment of the apparatus used for carrying out a method for manufacturing a plugged honeycomb structure of the present invention.

As another means, as shown in FIG. 4A, passages are formed with cylindrical bodies 45 on both of the one end face 40a side and the other end face side 40b of the plugged honeycomb structure 40, and an ejector 48 and a ceramic particle supplier 47 are disposed on the one end face 40a side. A fixed amount of ceramic particles 46 are supplied from the ceramic particle supplier 47, and the air 43 is sent in the ejector 48 at high speed to generate negative pressure, and thereby the ceramic particles 46 are sucked to be mixed with the gas (air). The ceramic particles 46 are carried by the gas current and discharged toward the one end face 40a. At this state, by sucking the ceramic particles 46 by, for example, a fan 44 (not illustrated) from the other end face 40b side, the ceramic particles 46 are conveyed by the air (gas current) into the cells of the plugged honeycomb structure 40 and adhere to the surfaces of the plugged honeycomb structure 40 in the cells.

[Third Membrane Forming Method]

Figure 5:
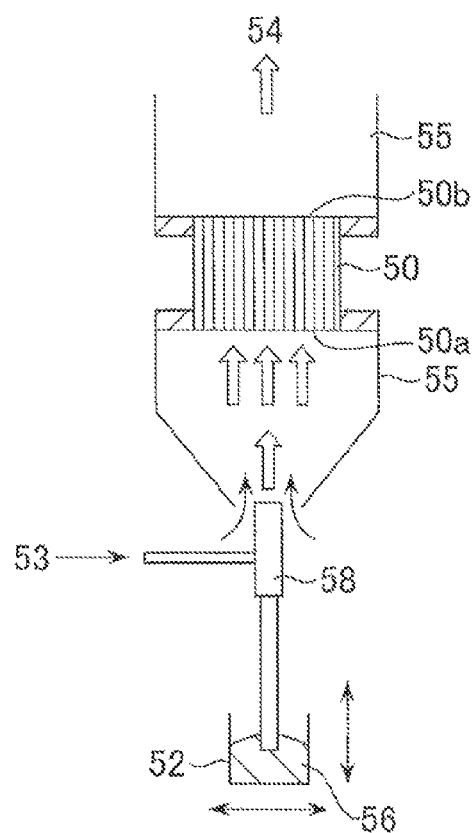
FIG. 5 is a schematic view showing still another embodiment of the apparatus used for carrying out a method for manufacturing a plugged honeycomb structure of the present invention.

As still another means, as shown in FIG. 5, passages are formed with cylindrical bodies 55 on both of the one end face 50a side and the other end face side 50b of the plugged honeycomb structure 50, and an ejector 58 and a container 52 are disposed on the one end face 50a side. Ceramic particles 56 are put in the container 52 in advance, and the container 52 is scanned to supply the ceramic particles 56. Also, by sending the air 53 in the ejector 58 at high speed, negative pressure is generated, and the ceramic particles 56 are sucked. The ceramic particles 56 are mixed with the gas (air) and are carried by the gas current to be discharged toward the one end face 50a. At this state, by sucking the ceramic particles 56 by, for example, a fan 54 (not illustrated) from the other end face 50b side, the ceramic particles 56 are conveyed by the air (gas current) into the cells of the plugged honeycomb structure 50 and adhere to the surfaces of the plugged honeycomb structure 50 in the cells.

Figure 4B:
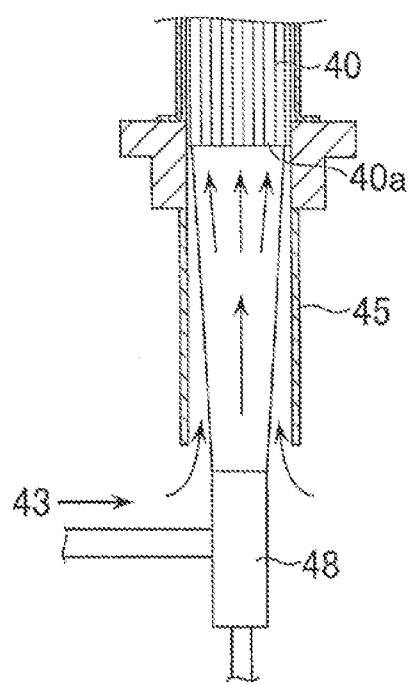
FIG. 4B is a schematic view showing an enlarged part of the apparatus shown in FIG. 4A.

Incidentally, for example, in the aforementioned apparatus shown in FIG. 4A (same in the apparatus shown in FIG. 5), by adjusting the amount of the air 43 sent into the ejector 48, the injection angle of the aerosol injected from the ejector 48 and the inertial energy of the aerosol injected above and the ceramic particles contained in the aerosol can be adjusted. This influences on the formation of the membrane formation distribution as explained above. For example, when the amount of the air 43 sent into the ejector 48 is increased, as shown in FIG. 4B, the injection angle of the ceramic particles 46 and the gas (aerosol) injected from the ejector 48 becomes small to cause direct irruption into the plugged honeycomb structure 40, and the ceramic particles 46 are hardly carried uniformly through the passages of the suction by the fan 44 (not illustrated). In addition, at the same time, ceramic particles 46 are prone to deposit on the outlet side of the plugged honeycomb structure 40.

Figure 4C:
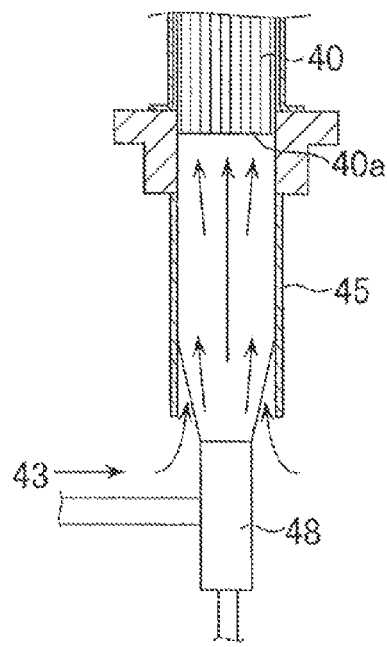
FIG. 4C is a schematic view showing an enlarged part of the apparatus shown in FIG. 4A.

On the other hand, when the amount of the air 43 sent into the ejector 48 is reduced, as shown in FIG. 4C, the injection angle of the ceramic particles 46 and the gas (aerosol) injected from the ejector 48 becomes large to allow the ceramic particles 46 to easily be carried uniformly through the passages of the suction by the fan 44. In addition, at the same time, since the kinetic energy of the ceramic particles 46 is reduced, the ceramic particles 46 enter the cells of the plugged honeycomb structure 40 according to the passage which only the suction of the fan 44 forms to make membrane formation easy. Incidentally, by the suction of the fan 44, the gas (air) other than the ceramic particles 46 and the gas (aerosol) injected from the ejector 48 is also sucked. The gas other than the aerosol seems to have little influence on the membrane formation in comparison with the kinetic energy of the ceramic particles 46 and the gas (aerosol) injected from the ejector 48.

Hereinbelow, the present invention will be described specifically with Examples.

Examples 1 to 9

There were mixed and kneaded 80 parts of silicon carbide, 20 parts of metal silicon, 13 parts of coke having an average particle diameter of 10 μm as a pore former, 35 parts of water as a dispersion medium, 6 parts of hydroxypropylmethyl cellulose as an organic binder, and 0.5 part by mass of ethylene glycol as a dispersant to prepare kneaded clay. Next, the kneaded clay was subjected to extrusion forming using a die having a quadrangular cell shape and a predetermined slit width to obtain a honeycomb-shaped substrate having an entire shape of prismatic column (cylinder). After the honeycomb-shaped substrate was dried with a microwave drier and further completely dried with a hot air drier, a mask was alternately applied to cell opening portions on an end face of the honeycomb-shaped substrate, and the end portion having the mask was immersed in plugging slurry containing the aforementioned silicon carbide to form plugging portions disposed alternately in a checkerwise pattern. After the plugging portions were formed at both the ends, drying was performed, and then firing was performed at 1430° C. for 10 hours in an Ar atmosphere. Thus, a quadrangular columnar plugged honeycomb structure was manufactured. The average pore size of the plugged honeycomb structure (partition walls) was 13 μm.

Then, using the ceramic particles made of the same material as the aforementioned substrate and having an average particle diameter of 3 μm membranes were formed on the plugged honeycomb structure on the basis of the second membrane forming method described above. Then, the plugged honeycomb structure (having trapping layers by membrane formation) was subjected to a thermal treatment and end face removal, and the structure was evaluated as a plugged honeycomb structure with surface trapping layers. The results are shown in Table 1. Incidentally, the quadrangular columnar plugged honeycomb structure had an axial length of 152.4 mm, across section perpendicular to the axis had a size of 36.2 mm×36.2 mm, the cell density was 46.5 cells/cm², and the partition wall thickness was 300 μm. The conditions of membrane formation and the evaluation items were as follows.

TABLE 1

| Example | Aerosol density [g/m³] | Flow rate inside cell [m/sec.] | Membrane formation amount [g] | Membrane formation time [sec.] | Pressure loss reduction rate with PM | Raw material yield | Initial pressure loss rise rate |
|---|---|---|---|---|---|---|---|
| 1 | 0.9 | 2 | 1.2 | 1200 | 33% | 20% | — |
| 2 | 1.8 | 2 | 1.2 | 600 | 31% | 70% | — |
| 3 | 22.2 | 2 | 1.2 | 50 | 32% | 88% | 8% |
| 4 | 1582.4 | 2 | 1.2 | 0.7 | 29% | 90% | — |

TABLE 1-continued

| Example | Aerosol density [g/m³] | Flow rate inside cell [m/sec.] | Membrane formation amount [g] | Membrane formation time [sec.] | Pressure loss reduction rate with PM | Raw material yield | Initial pressure loss rise rate |
|---|---|---|---|---|---|---|---|
| 5 | 2215.4 | 2 | 1.2 | 0.5 | 10% | 88% | — |
| 6 | 60.0 | 0.1 | 3.0 | 1000 | 28% | 5% | — |
| 7 | 60.0 | 0.3 | 3.0 | 400 | 30% | 50% | — |
| 8 | 60.0 | 97.0 | 3.0 | 1.2 | 27% | 89% | — |
| 9 | 60.0 | 116.4 | 3.0 | 1 | 13% | 89% | — |
| 10 | 148.4 | 12 | 14.8 | 2 | 25% | 85% | — |
| 11 | 9.9 | 12 | 14.8 | 30 | 28% | 83% | — |
| 12 | 0.6 | 12 | 14.8 | 500 | 29% | 30% | — |
| 13 | 22.2 | 2 | 1.2 | 50 | 32% | 88% | 26% |

[Membrane Formation Time]

Time from the start of sucking of the ceramic particles to the completion of sending all the ceramic particles in the structure was measured, and the time was defined as the membrane formation time.

[Suction Flow Amount]

An air flow meter was disposed on the suction side of the plugged honeycomb structure, and the flow amount conversion was performed to define the value as the suction flow amount [m³/min.].

[Membrane Formation Amount]

In the case that the end face removal was performed, (mass of the plugged honeycomb structure after the end face removal was performed after membrane formation)–(mass of the plugged honeycomb structure before membrane formation) was defined as the membrane formation amount [g]. In the case that the end face removal was not performed, (mass of the plugged honeycomb structure after membrane formation)–(mass of the plugged honeycomb structure before membrane formation) was defined as the membrane formation amount [g].

[Aerosol Density]

The aerosol density was obtained by membrane formation amount [g]/(suction flow amount [m³/min.]×membrane formation time [min.]).

[Average Particle Diameter of Ceramic Particle]

The average particle diameter of the ceramic particles was measured with a laser diffraction/scattering type particle diameter distribution measurement apparatus (LA-920 (trade name) produced by Horiba, Ltd.) according to JIS R 1629.

[Flow Rate Inside Cell]

The flow rate inside the cells [m/sec.] was obtained by suction flow amount [m³/min.]/(cross sectional area [m²] of plugged honeycomb structure×cell opening ratio [%]).

[Average Pore Size of Substrate]

A sample of 5 mm×5 mm×15 mm was cut out from the substrate, and the measurement was performed with a mercury porosimeter (Mercury Porosimeter MIC-9405 (trade name) produced by Shimadzu Corporation).

[Pressure Loss Reduction Rate with PM]

A plugged honeycomb structure having membranes formed therein and a plugged honeycomb structure having no membrane were mounted right under a turbo charger of a common-rail type 2.0 L diesel engine, the engine was driven with an engine rotational frequency of 2000 rpm with a fixed torque of 50 Nm, pressure loss was measured in a state that soot as particulate matter of 4 g/L was deposited, the reduced rate of the measured value of the structure having membranes with respect to that of the structure having no membrane was obtained as the pressure loss reduction rate [%] with PM. Incidentally, the soot deposition amount is deposition amount [g] of soot per 1 L of the plugged honeycomb structure.

[Initial Pressure Loss Rise Rate]

Pressure loss was measured at 1 m³/min. (10 m³/min. in Examples 10 to 12 described later) in a large-sized wind tunnel apparatus, and the rise rate of the measurement value of the structure with membranes with respect to that of the structure with no membrane was obtained as the initial pressure loss rise rate [%].

[Raw Material Yield]

It was obtained by the amount of the ceramic particles adhering to the plugged honeycomb structure/amount of the supplied ceramic particles. Incidentally, the adhesion amount [g] was obtained by (mass of segment–mass of segment with no membrane) after the membrane formation, and the supply amount [g] was obtained by the weighed value with an electronic scale.

Examples 10 to 12

There were mixed and kneaded 100 parts of cordierite forming raw material obtained by mixing alumina, aluminum hydroxide, kaolin, talc, and silica, 13 parts of coke having an average particle diameter of 10 μm as a pore former, 35 parts of water as a dispersion medium, 6 parts of hydroxypropylmethyl cellulose as an organic binder, and 0.5 part of ethylene glycol as a dispersant to prepare kneaded clay. Next, the kneaded clay was subjected to extrusion forming using a die having a predetermined slit width for alternately forming octagonal cells and quadrangular cells to obtain a honeycomb-shaped substrate having an entire shape of circular column (cylinder) having octagonal cells and quadrangular cells. After the honeycomb-shaped substrate was dried with a microwave drier and further completely dried with a hot air drier, a mask was alternately applied to cell opening portions on an end face of the honeycomb-shaped substrate, and the end portion having the mask was immersed in plugging slurry containing the aforementioned cordierite forming raw material to form plugging portions disposed alternately in a checkerwise pattern. After the plugging portions were formed at both the ends, drying was performed, and then firing was performed at 1430° C. for 10 hours in an Air atmosphere. Thus, a circular columnar plugged honeycomb structure was manufactured. The average pore size of the plugged honeycomb structure (partition walls) was 11 μm.

Then, using the ceramic particles made of the same material as the aforementioned substrate and having an average particle diameter of 3 μm membranes were formed on the plugged honeycomb structure on the basis of the third membrane forming method described above. Then, the plugged honeycomb structure (having trapping layers disposed therein by membrane formation) was subjected to a thermal treatment and end face removal, and the structure was evaluated. The results are shown in Table 1. Incidentally, the circular columnar plugged honeycomb structure had an axial length of 152.4 mm, a cross section perpendicular to the axis had a diameter of 143.8 mm, the cell density was 46.5 cells/cm$^2$, and the partition wall thickness was 300 μm.

Example 13

Silicon carbide was used as the framework particles to manufacture a quadrangular columnar plugged honeycomb structure, and membranes were formed on the plugged honeycomb structure on the basis of the second membrane forming method described above. Then, the plugged honeycomb structure (having trapping layers by membrane formation), before bonding, was subjected to a thermal treatment without performing end face removal, and the structure was evaluated as a plugged honeycomb structure with surface trapping layers. The other conditions were the same as in Example 3. The results are shown in Table 1.

(Discussion)

From Examples 1 to 5 and 10 to 12, it is understood that, when the aerosol density is below 1.0 g/m$^3$, the raw material yield falls to a large extent and, when the aerosol density is above 1600 g/m$^3$, the pressure loss reduction rate with PM becomes small.

In addition, from Examples 1 to 4 and 6 to 11, it is understood that, in the case that the aerosol density is in the range from 1.0 to 1600 g/m$^3$, when the flow rate inside the cells is below 0.2 m/sec., the raw material yield falls to a large extent, while, when the flow rate inside the cells is above 100 m/sec., the pressure loss reduction rate with PM becomes small. Therefore, it is understood that, in the case that the aerosol density is in the range from 1.0 to 1600 g/m$^3$ with the flow rate inside the cells of 0.2 to 100 m/sec., it is possible to efficiently form membranes by improving the raw material yield with raising the pressure loss reduction rate with PM.

In addition, it is understood from Examples 3 and 13, the initial pressure loss rise rate can be reduced by performing the end face removal.

A method for manufacturing a plugged honeycomb structure of the present invention is suitably used as a means for manufacturing a plugged honeycomb structure (honeycomb filter) with surface trapping layers used as a DPF. The DPF is a filter used for trapping particulate matter contained in gas discharged from internal combustion engines such as a diesel engine and various combustion apparatuses and purifying the gas.

What is claimed is:

1. A method for manufacturing a plugged honeycomb structure, the method comprising:
   a step of providing a mixture consisting essentially of ceramic particles and a gas on one end face side of the plugged honeycomb structure, and
   a step of sucking the gas containing the ceramic particles from the other end face side of the plugged honeycomb structure to send the ceramic particles mixed in the gas into cells of the plugged honeycomb structure to allow the ceramic particles to adhere to surfaces in the cells of the plugged honeycomb structure.

2. A method for manufacturing a plugged honeycomb structure according to claim 1, wherein, in the gas containing the ceramic particles, the mass of the ceramic particles per volume of the gas is 1 g/m$^3$ or more and 1600 g/m$^3$ or less.

3. A method for manufacturing a plugged honeycomb structure according to claim 1, wherein the flow rate of the gas containing the ceramic particles in the cells is 0.2 m/sec or more and 100 m/sec or less.

4. A method for manufacturing a plugged honeycomb structure according to claim 2, wherein the flow rate of the gas containing the ceramic particles in the cells is 0.2 m/sec or more and 100 m/sec or less.

5. A method for manufacturing a plugged honeycomb structure, the method comprising:
   a step of mixing ceramic particles with a carrier medium consisting of a gas on one end face side of the plugged honeycomb structure, and
   a step of sucking the gas containing the ceramic particles from the other end face side of the plugged honeycomb structure to send the ceramic particles mixed in the gas into cells of the plugged honeycomb structure to allow the ceramic particles to adhere to surfaces in the cells of the plugged honeycomb structure.

* * * * *